Jan. 11, 1966 C. J. QUARTLY 3,229,262
INFORMATION STORAGE DEVICE EMPLOYING MAGNETIC CORES
Filed Jan. 5, 1961 3 Sheets-Sheet 1
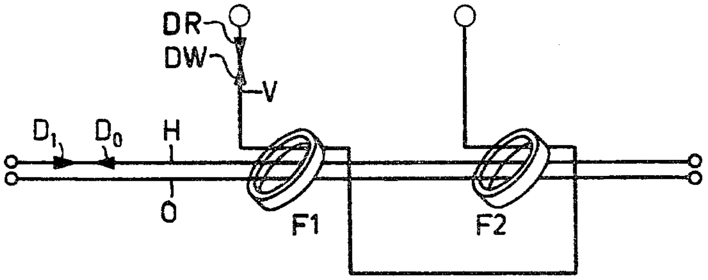
FIG. 1
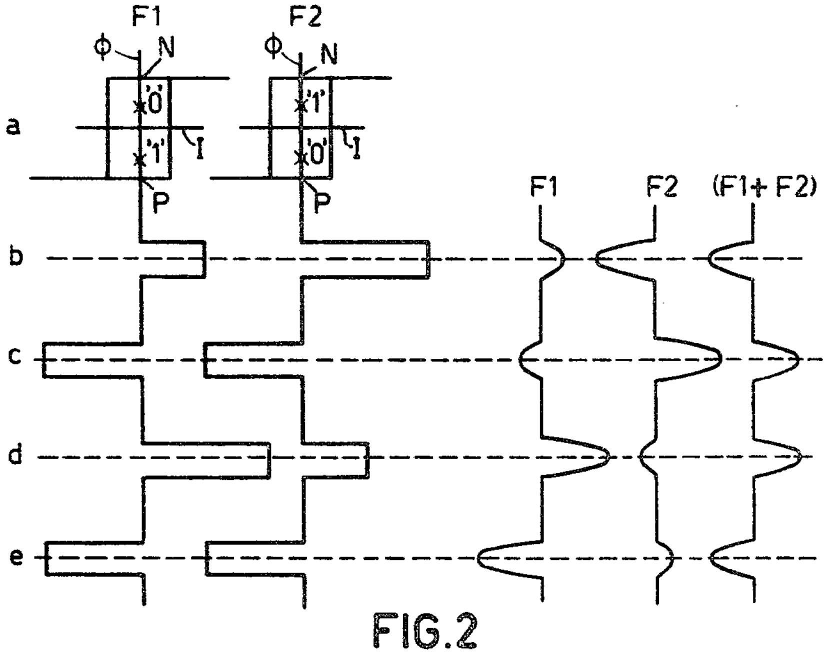
FIG. 2
| F1 | F2 | (F1+F2) |
|---|---|---|
| 1 | 1 | 1 |
| P | P | * |
| 0 | 0 | 0 |
FIG. 3
INVENTOR
*CHARLES J. QUARTLY*
BY
[signature]
AGENT INVENTOR
CHARLES J. QUARTLY
BY
Frank R. Trifari
AGENT Jan. 11, 1966 C. J. QUARTLY 3,229,262

INFORMATION STORAGE DEVICE EMPLOYING MAGNETIC CORES

Filed Jan. 5, 1961 3 Sheets-Sheet 3

INVENTOR
CHARLES J. QUARTLY
BY
Frank R. Trifari
AGENT

United States Patent Office 3,229,262

Patented Jan. 11, 1966

3,229,262

INFORMATION STORAGE DEVICE EMPLOYING MAGNETIC CORES

Charles John Quartly, Bletchingley, England, assignor to North American Philips Company, Inc., New York, N.Y., a corporation of Delaware Filed Jan. 5, 1961, Ser. No. 80,870
Claims priority, application Great Britain, Jan. 6, 1960, 488/60
9 Claims. (Cl. 340—174)

The invention relates to an information storage device containing storage elements each of which comprises two cores of magnetic material; the storage elements are arranged according to the rows and columns of a matrix, the elements of any one row being coupled to the same row conductor and the elements of any one column being coupled to the same column conductor. In order to supply binary information to an element a current is passed through the row conductor coupled with the elements, and a current having a polarity corresponding to the information is passed through the column conductor, the elements of a row being coupled to a common reading amplifier.

It is the object of the invention to provide an information storage device of the above-mentioned kind, in which the current flowing through a row conductor and supplying information does not produce a signal at the input of the corresponding reading amplifier. This enables the cycle time of the device to be reduced.

According to the invention, this object is achieved in that the elements of a row are divided into two sections, the sections being oppositely coupled with the reading amplifier as compared with their coupling with the row conductor.

In addition, the reading amplifier and the row conductor can be simply coupled to the storage elements through the same conductors. This is achieved by coupling each section with an individual auxiliary conductor, the auxiliary conductors being connected in adjacent sides of a bridge the other sides of which include resistors, opposite corners of the bridge being coupled with the corresponding reading amplifier whilst the other two corners are coupled with the corresponding row conductor.

The invention will now be described more fully with reference to the figures of the accompanying drawings.

FIG. 1 shows a known information storage element.

FIG. 2 shows pulse diagrams illustrating the operation of the storage element shown in FIG. 1.

FIG. 3 shows the various conditions of the storage element shown in FIG. 1.

The information storage element shown in FIG. 1 comprises two cores F1 and F2 of magnetic material having remanence. The cores are coupled with the horizontal conductor or row conductor H and with a vertical conductor or column conductor V. The horizontal and vertical conductors are coupled in the same sense to one core and are coupled in opposite senses to the other core. Furthermore, an output conductor O is provided.

FIG. 2*a* shows diagrammatically the hysteresis loops of the cores F1 and F2, which provide the relationship between the flux $\phi$ through a core and the current I through a winding provided on the core. The two extreme remanence conditions are designated N and P respectively.

The storage element (F1, F2) is in the read-out condition when the cores F1 and F2 are both in the condition P. This is shown by an asterisk in FIG. 3. The storage element is brought into this condition by passing a current pulse through the conductor V in the direction of an arrow DR (FIG. 1).

The storage element (F1, F2) is brought into the condition 1 by simultaneously passing a current pulse through the conductor H in the direction of an arrow D1 and through the conductor V in the direction of an arrow DW. The pulses counteract each other in the core F1 and act in support of one another in the core F2. This is shown in greater detail in FIG. 2*b*.

FIGS. 2*b*, *c*, *d*, *e* show from left to right the total control current of the cores F1 and F2, the voltage induced in the output conductor O by the cores F1 and F2 respectively, and the total output voltage of the element (F1, F2).

The storage element (F1, F2 is brought to the condition 0 by simultaneously passing a pulse through the conductor H in the direction of an arrow DO and through the conductor V in the direction of an arrow DW. This is shown in greater detail in FIG. 2*d*.

FIGS. 2*c* and 2*e* relate to the process of reading the information condition of the element (F1, F2) in its conditions 1 and 0 respectively.

The conditions 1 and 0 of each of the cores F1 and F2 do not coincide with the extreme remanence conditions. This is due to the fact that the cores are only partially flipped over by the very short pulses applied through the conductors H and V. The use of short pulses enables the cycle period of the information storage device to be reduced; it is seen that when using a two-core storage element of the type described the discrimination between the condition 0 and the condition 1 remains satisfactory even though the cores are only partially flipped over.

Figure 4:
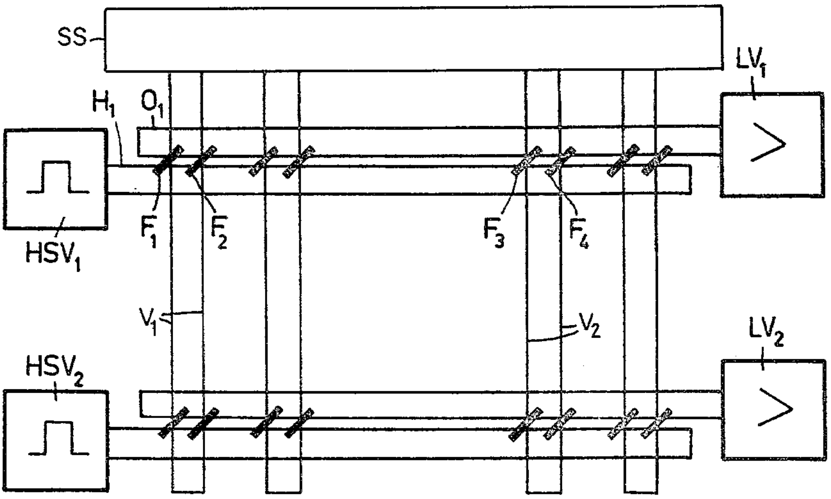
FIG. 4 shows a matrix information storage device.

FIG. 4 shows a matrix information storage comprising two rows and four columns. The horizontal conductor H1 couples all the storage elements of the first row with the horizontal writing amplifier HSV1, and output conductor O1 couples the storage elements with a reading amplifier LV1. The vertical conductor V1 is coupled with all the first cores of the storage elements of the first column in one direction and with the second cores in the other direction. Similarly, amplifiers HSV2 and LV2 are coupled with the storage elements of the second row and the remaining vertical conductors are coupled with the storage elements in the other columns.

The vertical conductors are connected to a selection and control circuit SS. This circuit at command delivers either a write pulse through a certain vertical conductor in the direction of the arrow DW or a read pulse in the direction of the arrow DR (FIG. 1).

A horizontal writing amplifier at command delivers a pulse through the horizontal conductor in the direction of an arrow D1 for the binary information 1 and in the direction of an arrow DO for the binary information 0.

A write pulse applied to a horizontal conductor produces flux variations in all the cores coupled with this conductor. As a result, a voltage is induced in the output conductor. This voltage appears also at the input terminals of the reading amplifier. The value of the voltage depends upon the nmber of the storage element in each row, however, normally it greatly exceeds the voltage of a storage element during the reading process. Hence, the reading amplifier, which is designed to amplify the latter voltage, is blocked by the pulse applied to the horizontal conductor during the writing process. In principle, this pulse need not influence the reading amplifier during reading of the information condition of a storage element, since this is effected at another instant. However, for a short cycle period of the information storage device it is of importance that the reading amplifier should deliver an output voltage as soon as possible after the writing of information. This result cannot be obtained if it should be necessary to delay the reading of the information in order to enable the reading amplifier to recover from the temporary blockage.

Figure 5:
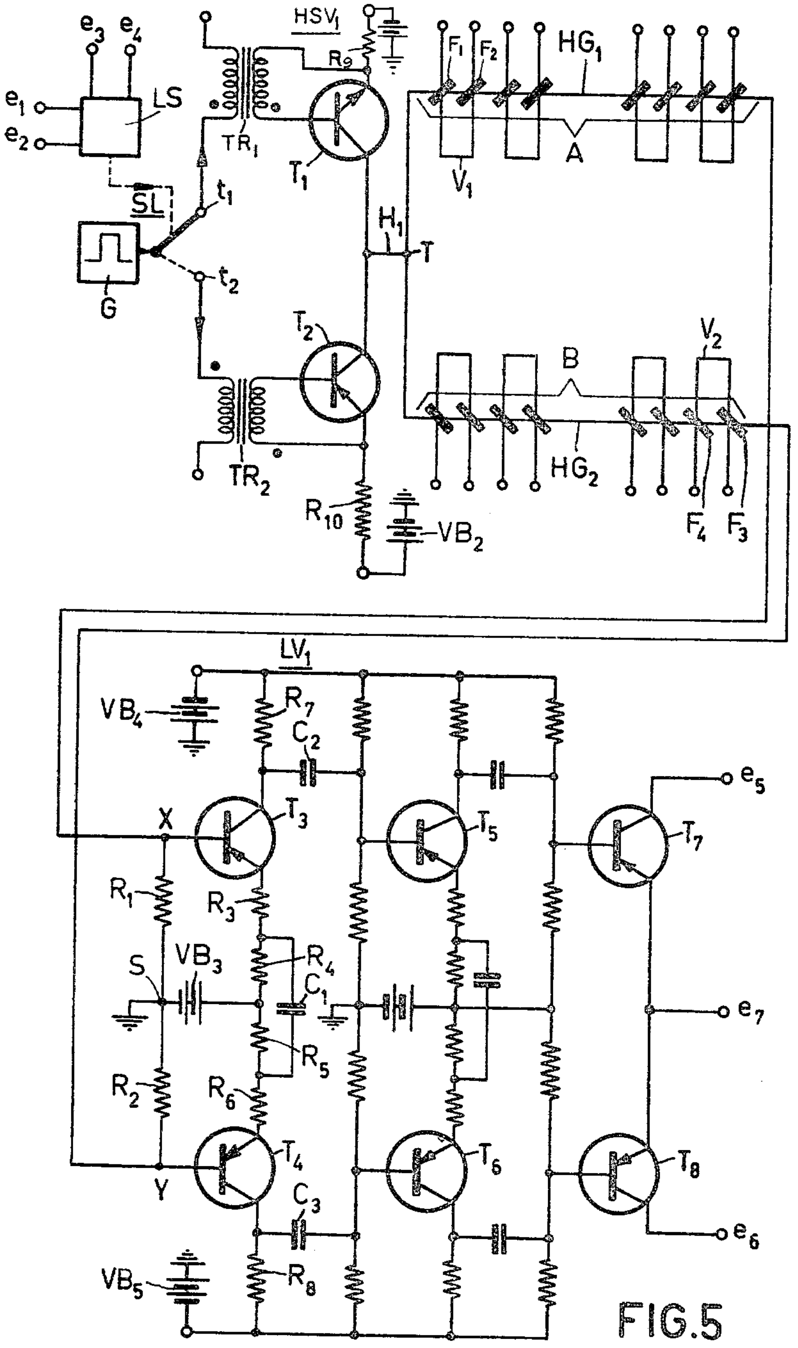
FIG. 5 shows an embodiment of an information storage device according to the invention.

FIG. 5 shows for the sake of simplicity one row of an information storage device. In order to avoid blocking of the reading amplifier LV1, the storage elements are divided into two sections A and B. The section A is coupled with an auxiliary conductor HG1 and the section B with an auxiliary conductor HG2. These conductors act as horizontal conductors and as output conductors. In section A, an element (F1, F2) is shown which is coupled with the vertical conductor V1, and in section B an element (F3, F4) is shown which is coupled with a vertical conductor V2. These elements are again shown in FIG. 4. The auxiliary conductors HG1 and HG2 together with resistors R1 and R2 are connected in a bridge having corners T, S, X and Y.

The corner T is connected through the horizontal conductor H1 to the horizontal writing amplifier HSV1. This comprises two parts provided with transistors T1 and T2 of opposite conductivity types. A pulse applied from terminal *t1*, through the transformer TR1 keeps the transistor T1 in the conductive condition, so that a current flows through the auxiliary conductors HG1 and HG2 from ground S through resistors R1 and R2 to conductor H1, and through transistor T1 and resistor R9 to the negative terminal of a supply battery VB1.

A pulse applied from terminal *t2*, through a transformer TR2 maintains the transistor T2 in the conductive condition, so that a current flows from the positive terminal of a supply battery VB2 through resistor R10, transistor T2, conductor H1, auxiliary conductors HG1 and HG2 and resistors R1 and R2 to ground S.

The first-mentioned current pulse through the conductors HG1 and HG2 decreases the voltage of both the corners X and Y. The second pulse increases the voltage of both these corners.

The pulses through the conductors HG1 and HG2 cause flux variations in the storage elements coupled therewith. The condition 0 and 1 of the two cores of a storage element are shifted with respect to the extreme remanence conditions N and P (FIG. 2). As a result, an energizing current in a certain direction will cause a flux variation which is substantially equal for the conditions 0 and 1. Thus, voltages in the points X and Y are increased or decreased to the same extent, irrespective of the information contents of the sections A and B.

Reading amplifier LV1, which may be a differential voltage amplifier, is connected to the points X and Y. This comprises two identical stages including transistors T3, T4 and T5, T6 respectively. The transistor T3 is provided with negative feed-back in its emitter circuit by resistors R3 and R4, and the transistor T4 by resistors R5 and R6. The junction of the resistors R4 and R5 is connected to the positive terminal of a supply battery VB3, a capacitor C1 shunting the two resistors. The collector of the transistor T3 is connected, through a resistor R7, to the negative terminal of a supply battery VB4 and, through a capacitor C2, to the next stage. The collector of the transistor T4 is connected, through a resistor R8, to the negative terminal of a supply battery VB5 and, through a capacitor C3, to the next stage. An equal voltage variation of the points X and Y produced no voltage variation across the capacitor C1, because the currents through the transistors vary equally. The transistors T3 and T4 then are provided with negative feedback by the large resistors R4 and R5 so that the amplification is small. Hence, the reading amplifier cannot be overdriven in either direction.

From FIGURES 1 and 5 it follows that a pulse through the auxiliary conductor HG1 in the direction from the point X to the point T corresponds with a current in the direction of the arrow DO, and a pulse through the auxiliary conductor HG2 in the direction from the points Y to the point T corresponds to a current in the direction of an arrow D1. Hence, provision is made of a switch SL connecting a pulse generator G to the terminal *t1* for writing the information 0 in the section A and the information 1 in the section B. In its other position, the switch SL connects the pulse generator G to the terminal *t2* for supplying the information 1 to the section A and the information 0 to the section B. The switch SL is controlled by a logical switch S which at its terminals *e1* and *e2* receives the information whether 1 or 0 has to be written, and at its terminal *e3* and *e4* receives the information whether writing must be effected into the section A or into the section B.

Reading out the information from a storage element is performed in the manner described hereinbefore. It should be noted that the elements of the same information condition in different sections deliver opposite output voltages. These voltages are amplified by the reading amplifier LV1 and applied to the strobe circuit comprising transistors T7 and T8. The voltage across the capacitor C1 varies during amplification so that the negative feedback of the transistors T3, T4 is temporarily reduced.

To a terminal *e7* strobe pulses are applied at the instants at which the information condition of a storage element is read. These pulses maintain the transistor T7 conductive in the case of the information 0 and the transistor T8 in the case of the information 1. The output signal is taken from terminals *e5* and *e6*.

Figure 6:
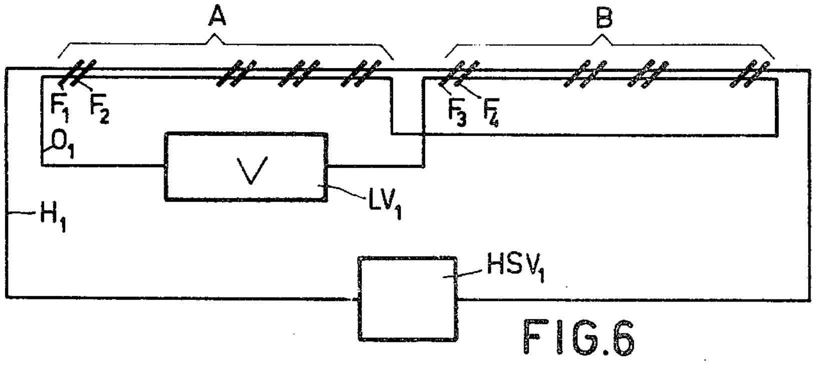
FIGS. 6 and 7 show modifications of the information storage device shown in FIG. 5.
Figure 7:
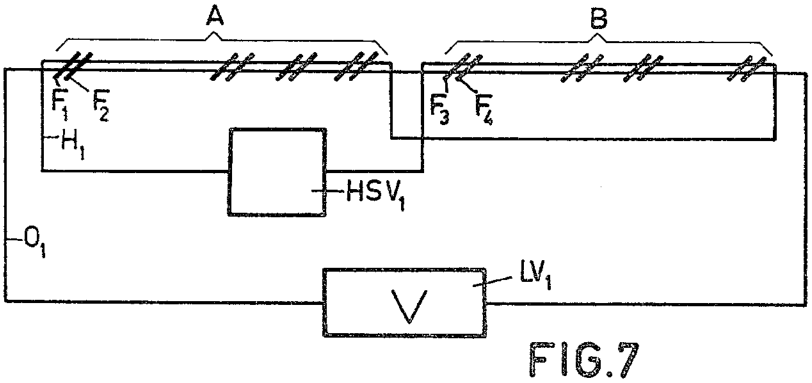

FIG. 6 schematically shows another possible embodiment. In this embodiment, a separate output conductor O1 and a separate horizontal conductor H1 are used. The conductor O1 couples the sections A and B in opposite senses with the reading amplifier LV1. The conductor H1 couples the sections A and B in the same sense with the horizontal writing amplifier HSV1. The embodiment shown in FIG. 7 comprises the wiring arrangement of the embodiment of FIG. 6; the difference with respect to the latter figure is that the amplifiers LV1 and HSV1 are interchanged. It is clear that the arrangements of FIGS. 6 and 7 are electrically equivalent.

What is claimed is:

1. An information storage device containing storage elements each of which comprises two cores of magnetic material having remanence which are arranged according to the rows and columns of a matrix, all cores of the elements of any one row being coupled with the same row conductor and the cores of an element of any one column being coupled with the same column conductor in opposite senses means for supplying binary information to an element comprising means for passing a current of a predetermined polarity through the row conductor coupled with the element and means for passing a current through the column conductor coupled with the element, a common reading amplifier coupled to all the elements of a particular row, the elements of each row being divided into two sections which are coupled with said reading amplifier in a sense opposite to their coupling with the row conductor.

2. An information storage device as claimed in claim 1, wherein each section is coupled with an individual auxiliary conductor, the auxiliary conductors being connected in adjacent sides of a bridge, the other sides of the bridge including resistance elements, two opposite corners of the bridge being coupled to the corresponding reading amplifier and the other two opposite corners being coupled with the corresponding row conductor.

3. An information storage device as claimed in claim 1, wherein the reading amplifier is a differential amplifier.

4. An information storage device as claimed in claim 2, wherein the reading amplifier is a differential amplifier.

5. A binary magnetic information storage arrangement of the two-core-per-bit type comprising a series of pairs of remanent magnetic cores divided into two sections, each core being coupled to a common write conductor, means for applying input digit pulses to said write conductor, an individual read/write drive wire coupling each pair of cores in opposite senses and connected to a selection system, a digit drive circuit common to both sections for applying digit pulses simultaneously to each section, and a common reading amplifier circuit connected to the two sections, any voltages developed across the two sections by application of an input digit pulse being in mutual opposition at the input to the amplifier.

6. An information storage arrangement according to claim 1, wherein the two sections are connected in series with each other to the amplifier.

7. An information storage arangement according to claim 5, wherein the amplifier circuit is a differential amplifier circuit.

8. An information storage arrangement according to claim 5, wherein a plurality of said series of pairs of cores are arranged in a matrix having rows and columns so arranged that the read/write drive wire of any pair of cores in one series is shared by a corresponding pair in each of the other series.

9. An information storage arrangement according to claim 7, wherein a plurality of said series of pairs of cores are arranged in a matrix having rows and columns so arranged that the read/write drive wire of any pair of cores in one series is shared by a corresponding pair in each of the other series.

References Cited by the Examiner

UNITED STATES PATENTS

| | | | |
|---|---|---|---|
| 2,666,151 | 1/1954 | Rajchman | 307—88 |
| 2,947,977 | 8/1960 | Bloch | 340—174 |
| 3,050,716 | 8/1962 | Andrews | 340—174 |
| 3,112,470 | 11/1963 | Barrett | 340—174 |

BERNARD KONICK, *Primary Examiner.*

JOHN F. BURNS, IRVING L. SRAGOW, *Examiners.*